United States Patent [19]

Ishida et al.

[11] Patent Number: 5,084,496
[45] Date of Patent: Jan. 28, 1992

[54] COMPOSITION WHICH CONTAINS A POLYPHENYLENE ETHER RESIN AND A POLYESTER

[75] Inventors: Hiromi Ishida; Masataka Morioka, both of Moka, Japan

[73] Assignee: GE Plastics Japan, Ltd., Tokyo, Japan

[21] Appl. No.: 450,117

[22] Filed: Dec. 13, 1989

[30] Foreign Application Priority Data

Dec. 13, 1988 [JP] Japan .................................. 63-312819

[51] Int. Cl.$^5$ ........................... C08J 5/10; C08K 5/52; C08L 85/02
[52] U.S. Cl. ..................................... 524/127; 524/539; 525/397
[58] Field of Search ................. 524/127, 539; 525/397

[56] References Cited

U.S. PATENT DOCUMENTS

| | | | |
|---|---|---|---|
| 4,139,574 | 2/1979 | Cooper et al. | 524/127 |
| 4,584,332 | 4/1986 | Talley et al. | 524/137 |
| 4,672,086 | 6/1987 | Seiler et al. | 524/127 |
| 4,845,160 | 7/1989 | Sybert | 525/397 |

Primary Examiner—Paul R. Michl
Assistant Examiner—U. K. Rajguru
Attorney, Agent, or Firm—Francis T. Coppa; Joseph T. Eisele

[57] ABSTRACT

Thermoplastic molding compositions of blends of polyphenylene ethers and polyesters are improved in respect to impact resistance by the addition of an organophosphorus compound of the formula:

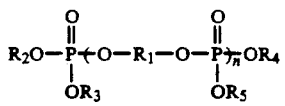

wherein $R_1$ when taken independently is selected from divalent hydrocarbon residues containing 2-12 carbon atoms; each of $R_2$-$R_5$ when taken independently are selected from the group consisting of alkyl groups of 2 to 12 carbon atoms, aryl groups containing 6-14 carbon atoms, alkyl-substituted aryl groups, aralkyl groups, halogen-substituted alkyl groups, halogen-substituted aryl groups of 6-14 carbon atoms, halogen-substituted alkyl-substituted aryl groups, and halogen-substituted aralkyl groups; two groups selected from among $R_1$-$R_5$ may be bonded together and form a ring; provided at least one member selected from among $R_1$-$R_5$ has a carbon-carbon unsaturated double bond or triple bond, and at least one member selected from among $R_1$-$R_5$ is an oxazoline residue; and n is an integer of 0-5. It is believed that the organophosphorus compound under the influence of heat during thermal processing functions to couple the polyphenylene ether to the polyester, therby improving impact resistance of molded articles.

12 Claims, No Drawings

COMPOSITION WHICH CONTAINS A POLYPHENYLENE ETHER RESIN AND A POLYESTER

BACKGROUND OF THE INVENTION

1. Field of the Invention

The present invention concerns a resin composition which contains polyphenylene ether and a polyester and characterized by excellent mechanical properties and oil resistance.

2. Brief Description of the Prior Art

Although polyphenylene ether exhibits various excellent properties (e.g., high heat resistance as well as excellent strength, electrical properties, and dimensional precision), said resin is easily degraded by aromatic hydrocarbons (e.g., benzene, etc.) or halogenated hydrocarbons (e.g., Triclene, etc.). Since the molding efficiency is inferior, furthermore, said resin is seldom used as a single molded product.

To improve the molding efficiency of polyphenylene ether, attempts have been made to mix in a polystyrene resin. If this method is implemented, the molding efficiency is improved, but since the polystyrene resin is also degraded by aromatic hydrocarbons (e.g., benzene, etc.) or halogenated hydrocarbons (e.g., Triclene, etc.), it is impossible to improve the solvent resistance by adding said polystyrene resin.

Attempts have also been made to add a thermoplastic polyester resin to simultaneously improve the molding efficiency and solvent resistance (see Japanese Kokai Patent No. Sho 59[1984]-159847). Since the miscibility between the polyphenylene ether and thermoplastic polyester is inferior, however, the mechanical strength of a molded product derived from the resulting mixture is inevitably inferior.

If a compound which contains at least one group selected from among carboxyl groups, acid anhydride groups, acid amide groups, imide groups, carboxylic acid ester groups, epoxy groups, amino groups, and a hydroxyl group is added to a polyphenylene ether-polyester mixture as a third component, a resin composition which yields a molded product characterized by excellent bending elasticity, heat resistance, molding efficiency, and water resistance is allegedly obtained (see Japanese Kokoku Patent No. Sho 63[1988]-350).

It has also been proposed that a resin composition which yields a molded product characterized by excellent physical appearance, impact resistance, molding efficiency, dimensional precision, and chemical resistance can be obtained by adding a bifunctional epoxy compound (see Japanese Kokoku Patent No. Sho 63[1988]-39958).

Attempts have also been made to enhance the dispersibility between the polyphenylene ether and polyester by adding a polymer which has been obtained by reacting an epoxy group-containing polyphenylene ether with a polyester (see Japanese Kokoku Patent No. Sho 63[1988]-125569).

SUMMARY OF THE INVENTION

The foremost objective of the present invention is to provide a resin composition which contains a polyphenylene ether and polyester and which yields a molded product characterized by excellent mechanical strength (especially the impact resistance) as well as superb solvent resistance.

DETAILED DESCRIPTION OF THE INVENTION

The present inventors have discovered that the mechanical strength of said molded product can be significantly improved by adding a phosphorus-containing compound substance, an intramolecular oxazoline residue having an unsaturated bond.

Briefly, the present invention concerns a resin composition which is obtained by adding 0.05-30 parts by weight of an organophosphorus compound represented by the following formula I:

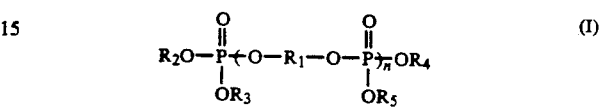

(in which $R_1$–$R_5$ are selected from among aliphatic hydrocarbon residues containing 2-12 carbon atoms, aryl groups containing 6-14 carbon atoms, alkyl-substituted aryl groups, aralkyl groups, and corresponding divalent residues; said groups may also be substituted with halogen atoms, and if there are two or more groups corresponding to $R_1$, they may be identical to or different from one another; two groups selected from among $R_1$–$R_5$ may be bonded and form a ring; at least one member selected from among $R_1$–$R_5$ is a carbon-carbon unsaturated double bond or triple bond, and at least one member selected from among $R_1$–$R_5$ is an oxazoline residue; n is an integer of 0-5) to a mixture consisting of 5-90 parts by weight of a polyphenylene ether resin and 10-95 wt% of a polyester resin (total weight of said mixture: 100 parts by weight).

As polyphenylene ether component of the present invention, conventionally known resins can be used. For example, homopolymers or copolymers obtained by oxidizing and polymerizing one or more monocyclic phenol compounds represented by the following general formula:

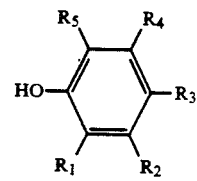

(in which $R_1$–$R_5$ are selected from among a hydrogen atom, halogenated hydrocarbon groups, hydrocarbon groups, and substituted hydrocarbon groups) can be appropriately used.

Examples of such polymers include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, etc. An especially desirable polyphenylene ether resin is poly(2,6-dimethyl-1,4-phenylene) ether. As a polyphenylene ether copolymer, a copolymer in which the aforementioned polyphenylene ether repetition unit is partially substituted with an alkyltrisubstituted phenol (e.g., 2,3,6-trimethylphenol, etc.) can be used. It is also possible to use a copolymer in which a styrene compound is grafted with said polyphenylene ether. As such a styrene-grafted polyphenylene ether, a copolymer obtained by graft-polymerizing a styrene compound (e.g., styrene, α-methylstyrene, vinyltoluene, chlorostyrene, etc.) with the aforementioned polyphenylene ether can be appropriately used.

It is desirable that the specific viscosity of the polyphenylene ether of the present invention (which is measured in a chloroform solvent at 30° C.) be 0.15-0.65 dL/g, preferably 0.30-0.60 dL/g. If the specific viscosity is lower than 0.15, the resulting composition is inevitably brittle, and the mechanical strength is low. If the specific viscosity exceeds 0.65, on the other hand, the viscosity difference of the polyphenylene ether and the thermoplastic polyester resin is too large. Thus, it is difficult to attain a satisfactory dispersibility, and it is difficult to attain the objectives of the present invention.

The polyester resin used in the present invention contains an intramolecular ester bond in the principal chain. As such, polycondensed polyesters derived from dicarboxylic acids or their derivatives and divalent alcohols or divalent phenol compounds, polycondensed polyesters derived from dicarboxylic acids or their derivatives and cycloether compounds, polycondensed polyesters derived from metal dicarboxylates and dihalogenated compounds, and polyesters obtained by ring-opening and polymerizing cycloester compounds can be used. As the aforementioned acid derivatives, acid anhydrides, esters, and acid chlorides can be used. As said dicarboxylic acids, both aliphatic and aromatic compounds can be used. Representative examples are terephthalic acid, isophthalic acid, phthalic acid, chlorophthalic acid, oxalic acid, succinic acid, and adipic acid. Especially desirable results are obtained if aromatic dicarboxylic acids are used. In particular, terephthalic acid, isophthalic acid, and phthalic acid are ideal.

As divalent alcohols, ethylene glycol, propylene glycol, butane-1,4-diol, hexamethylene glycol, etc., can be used. In particular, ethylene glycol and butane-1,4-diol are ideal. As divalent phenol compounds, bisphenol A, resorcinol, etc., can be used. As cycloether compounds, ethylene oxide and propylene oxide can be used. As cyclic compounds [sic], ε-caprolactone, etc., can be used. As dihalogenated compounds which are reacted with metal dicarboxylates, compounds obtained by substituting two hydroxyl groups of the aforementioned divalent alcohol compounds or divalent phenol compounds with halogen atoms (e.g., chlorine, bromine, etc.) are used.

The polyester resin which is used in the resin composition of the present invention is manufactured using the aforementioned feed components according to conventionally known procedures. It is desirable that the molecular weight be selected so that the specific viscosity, which is measured in a phenoltetrachloroethane mixed solvent (weight ratio: 1:1) at 30° C., will be 0.50 or above, preferably 0.55 or above. If the specific viscosity is lower than 0.50, it is difficult to produce a mixture characterized by excellent mechanical properties even if the resulting polyester is mixed with polyphenylene ether.

The aforementioned compound of the present invention represented by formula I, which contains an unsaturated bond and an oxazoline residue

(II)

can be manufactured according to the following procedures:

Phosphorus oxychloride, which is represented by the following formula III, and vinylphenol, which is represented by the following formula IV, are reacted to synthesize a compound represented by the following formula V:

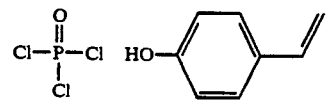

(III)    (IV)

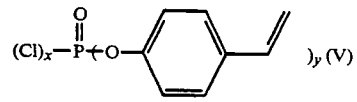

(in which x is 1 or 2: the sum of x and Y are 3: _// is a residue which contains a carbon-carbon unsaturated bond), and if said compound V is reacted with a compound represented by the following formula VI:

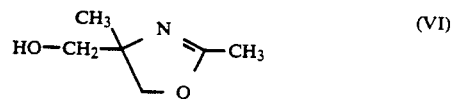

the compound of the present invention represented by the following formula VII is obtained:

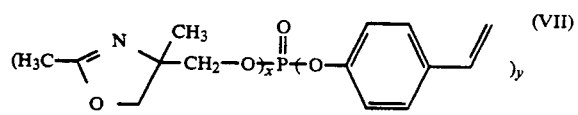

Two or more members selected from among $R_1$–$R_5$ in formula I may be mutually bonded and form a ring which contains an oxazoline residue. In other words, a compound characterized by the following structure:

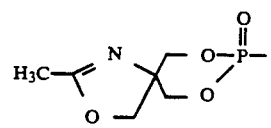

can also be used.

The following are representative examples of examples represented by formula I, although these compounds in no way constitute an exhaustive list:

1. Dimethyloxazolinylmethylbisvinylphenyl phosphate (n=0; $R_2$=dimethyloxazolinylmethyl; $R_3$=$R_4$=vinylphenyl).

2. Bis(dimethyloxazolinylmethyl)vinylphenyl phosphate (n=0; $R_2$=$R_3$=dimethyloxazolinylmethyl; $R_4$=vinylphenyl) (in the aforementioned description, dimethyloxazolinylmethyl= and vinylphenyl

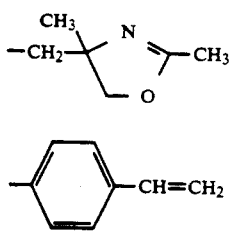

3. Bis(dimethyloxazolinylmethyl)-4-maleimidephenyl phosphate (n=0; R₂=R₃=dimethyloxazolinylmethyl; R₄=4-maleimidephenyl).

4. Dimethyloxazolinylmethylbis(4-maleimidephenyl) phosphate (n=0; R₂=dimethyloxazolinylmethyl; R₃=R₄=4-maleimidephenyl) (in the aforementioned description, 4 maleimidephenyl =

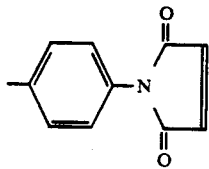

5. Dimethyloxazolinylmethylbix(2-methacryloxyethyl) phosphate (n=0; R₂=dimethyloxazolinylmethyl; R₃=R₄=2-methacryloxyethyl).

6. Bis(dimethyloxazolinylmethyl)-2-methacryloxyethyl phosphate (n=0; R₂=R₃=dimethyloxazolinylmethyl; R₄=2-methacryloxyethyl) (in the aforementioned description, 2-methacryloxyethyl =

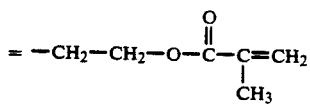

As far as the present invention is concerned, it is necessary that the weight ratio between the polyphenylene ether resin and the polyamide resin be 5–90:95–10, preferably 20–80:80–20. If the quantity of the polyphenylene ether resin is less than the aforementioned ratio, the heat resistance of the resulting molded product is inferior. If the quantity of the polyester resin is less than said range, the solvent resistance is inferior. It is necessary that the quantity of the organophosphorus compound represented by formula I with respect to 100 parts by weight of the combined weights of the polyphenylene ether resin and polyester resin be 0.05–30 parts by weight, preferably 0.1–10 parts by weight. If the quantity added is less than said range, it is impossible to attain the objective effects of the present invention (i.e., it is impossible to enhance the miscibility between the two resins and to enhance the mechanical properties of the resulting molded product). If the quantity added exceeds said range, on the other hand, the mechanical properties deteriorate.

When the resin composition of the present invention is manufactured, the aforementioned components can be mixed together in an arbitrary order by a conventional method. In a representative format, the individual components are dispersed and mixed using a high-speed mixer (e.g., tumble mixer, henschel mixer, etc.) and then melt-mixed using an extruder, Banbury mixer, roll, etc.

When the resin composition of the present invention is heated, the unsaturated bond in the compound represented by formula I is bonded with the polyphenylene ether resin. Thus, the oxazoline residue is presumably bonded with the polyester resin. When the resin composition of the present invention is manufactured, the following formats can be selected: (1) a format in which the polyphenylene ether resin, polyester resin, and the compound represented by formula I are simultaneously melt-mixed; (2) a format in which the polyphenylene ether resin and the compound represented by formula I are melt-mixed and in which the resulting mixture is melt-mixed with the polyester resin; (3) a format in which the polyester resin and the compound represented by formula I are melt-mixed and in which the resulting mixture is melt-mixed with the polyphenylene ether resin; (4) a format in which a mixture consisting of the two resins is melt-mixed with the compound represented by formula I. Thus, there are no restrictions on the mixing order.

The resin composition of the present invention, furthermore, may also contain various other components. For example, organic peroxides may be added to accelerate the reaction between the compound represented by formula I and the polyphenylene ether resin. Concrete examples of such organic peroxides include benzoyl peroxide, dicumyl peroxide, t-butyl hydroperoxide, cumene hydroperoxide, etc.

The resin composition of the present invention, furthermore, may also contain a polystyrene resin which is miscible with polyphenylene ether. Concrete examples of such polystyrene resins include homopolymers derived from styrene or its derivatives, styrene polymers which have been modified by mixing or interacting [sic] natural or synthetic elastomers (e.g., polybutadiene, polyisoprene, butyl rubber, EPDM rubber, ethylene-propylene copolymer, natural rubber, polysulfide rubber, polyurethane rubber, epichlorohydrin, etc.), and styrene-containing copolymers (e.g., styrene-acrylonitrile copolymer (SAN), styrene-butadiene copolymer, styrene/ethylene-propylene copolymer, styrene/ethylene-butylene copolymer, styrene-maleic anhydride copolymer, styrene-acrylonitrile-butadiene copolymer (ABS), and a copolymer consisting of poly-α-methylstyrene, ethylvinylbenzene, and divinylbenzene). In particular, the polystyrene homopolymer and a rubber-modified polystyrene which has been obtained by mixing or grafting 3–30 wt%, preferably 4–12 wt%, of a polybutadiene rubber or EPDM rubber are especially desirable as the resin of the present invention.

There are no special restrictions on the mixing ratio between the polyphenylene ether resin and the styrene polymer. Generally speaking, however, a ratio of 5–100:95–0 is especially desirable.

Ordinary elastomers which are highly miscible with polyester may also be added to the resin composition of the present invention.

If necessary, furthermore, various additives or fillers may also be added to the resin composition of the present invention in consideration of certain objectives. Concrete examples of such additives include stabilizers (e.g., steric hindered phenols, organophosphites, phosphonites, phosphonous acid, cyclic phosphonites, hydrazine derivatives, amine derivatives, carbamate derivatives, thioethers, phosphoric triamide, benzoxazole derivatives, metal sulfides, etc.), ultraviolet absorbents (e.g., benzotriazole derivatives, benzophenone derivatives, salicylate derivatives, steric hindered amines, oxalic diamide, etc.), lubricants (e.g., olefin wax, fatty acid metal salts, fatty acid amides, etc.), bromine-containing or phosphorus-containing flame retardants (e.g., decabromobiphenyl, pentabromotoluene, decabromobiphenyl ether, etc.), pigments (e.g., titanium oxide, zinc oxide, carbon black, etc.), inorganic fillers (e.g., glass beads, glass fiber, wallastonite, mica, talc, clay, calcium carbonate, silica, etc.), metal flakes (e.g., copper, nickel, aluminum, zinc, etc.), metal fibers (e.g., aluminum fiber, aluminum alloy fiber, brass fiber, stainless steel fiber, etc.), and organic fillers (e.g., carbon fiber, aromatic polyester fiber, etc.). The optimum quantities of these additives depend on the types of compounds used as well as application objectives.

In the paragraphs to follow, the contents of the present invention will be explained in further detail with reference to application examples.

EXAMPLES

Poly(2,6-dimethyl-1,4-phenylene) ether (specific viscosity: 0.46 dL/g in chloroform at 30° C.) was used as polyphenylene ether (PPO)® in subsequent application examples.

Polybutylene terephthalate (PBT) (Valox®, trademark of Engineering Plastics Co.) was used as a polyester.

As a phosphorus-containing compound represented by formula I, the compound represented by formula VII (mixture of compounds in which x values are 1 and 2) was used.

In some of the examples, SEBS (KG 1651, manufactured by Shell Chemical Co.) was used as a styrene elastomer.

In some of the comparative examples, maleic anhydride, which is a conventionally known miscibility enhancer, was added.

A resin composition characterized by one of the compositions shown in the table below (parts by weight) was prepared. After the individual components shown in the table had been sufficiently dispersed and mixed in a henschel mixer, the resulting mixture was melt-mixed in a 50-mm biaxial screw extruder at a cylinder temperature of approximately 280° C. Thus, a pellet was obtained. The resulting pellet was injection-molded under the following conditions. Thus, a physical property measurement test piece was obtained: cylinder temperature: 260° C.; injection pressure: 700 kg/cm²; mold temperature: 80° C.

The impact resistance was evaluated by measuring the Izod impact strength (with a notch) according to the procedures specified in ASTM D 256.

|     | ① | ② | ② | ① | ② | ① | ② |
|-----|-----|-----|-----|-----|-----|-----|-----|
| PPO | 50 | 50 | 50 | 40 | 40 | 40 | 40 |
| PBT | 50 | 50 | 50 | 60 | 60 | 60 | 60 |
| ③   | 2 |   |   | 2 |   | 2 |   |
| ④   |   | 1 |   |   |   |   |   |
| SEBS |   |   |   |   |   | 10 | 10 |
| ⑤   | 3.9 | 1.6 | 2.1 | 4.6 | 2.1 | 16.3 | 3.1 |

Key:
① Application Example
② Comparative Example
③ Compound represented by formula VII
④ Maleic anhydride
⑤ Izod impact strength As the foregoing explanations clearly demonstrate, it is obvious that the impact resistance of the molded product derived from the resin composition of the present invention is significantly improved.

We claim:

1. A thermoplastic resin molding composition which comprises;
   a. 5–90 parts by weight of a polyphenylene ether resin;
   b. 10–95 parts by weight of a thermoplastic polyester resin; and
   c. 0.5–30 parts by weight of 100 parts of the combined polyphenylene ether and the polyester resins, of a coupling agent which is an organophosphorus compound represented by the formula:

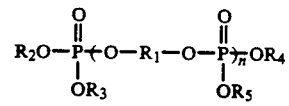

wherein $R_1$ when taken independently is selected from divalent hydrocarbon residues containing 2–12 carbon atoms; each of $R_2$–$R_5$ when taken independently are selected from the group consisting of alkyl groups of 2 to 12 carbon atoms, aryl groups containing 6–14 carbon atoms, alkyl-substituted aryl groups, aralkyl groups, halogen-substituted alkyl groups, halogen-substituted aryl groups of 6–14 carbon atoms, halogen-substituted alkyl-substituted aryl groups, and halogen-substituted aralkyl groups; two groups selected from among $R_1$–$R_5$ may be bonded together and form a ring; provided at least one member selected from among $R_1$–$R_5$ has a carbon-carbon unsaturated double bond or triple bond, and at least one member selected from among $R_1$–$R_5$ is an oxazoline residue; and n is an integer of 0–5.

2. An article thermally processed and molded from a melt blend of the composition of claim 1.

3. The composition of claim 1 wherein the organophosphorus compound is bis(dimethyloxazolinylmethyl)-vinylphenyl phosphate.

4. The composition of claim 1 wherein the organophosphorus compound is dimethyloxazolinylmethylbis-vinylphenyl phosphate.

5. The composition of claim 1 wherein the organophosphorus compound is bis(dimethyloxazolinylmethyl)-4-maleimidephenyl phosphate.

6. The composition of claim 1 wherein the organophosphorus compound is dimethyloxazolinylmethyl-bis(4-maleimidephenyl) phosphate.

7. The composition of claim 1 wherein the organophosphorus compound is dimethyloxazolinylmethyl-bis(2-methacryloxyethyl) phosphate.

8. The composition of claim 1 wherein the organophosphorus compound is bis(dimethyloxazolinylmethyl)-2-methacryloxyethyl phosphate.

9. The composition of claim 1 wherein the polyester is polybutylene terephthalate.

10. The composition of claim 1 wherein the polyphenylene ether is poly(2,6-dimethyl-1,4-phenylene) ether.

11. The composition of claim 1, wherein the polyphenylene ether is a copolymer of poly(2,6-dimethyl-1,4-phenylene) ether and 2,3,6-trimethyl-1,4-phenylene ether.

12. The composition of claim 1 wherein the polyphenylene ether is poly(2,6-dimethyl-1,4-phenylene ether, the polyester is polybutylene terephthalate and the organophosphorus compound is a mixture of compounds of the formula:
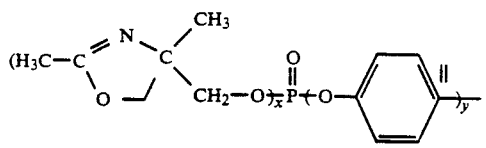
wherein x is 1 or 2 and the sum of x+y is 3.
* * * * *